United States Patent
Gommel et al.

(10) Patent No.: US 6,279,749 B1
(45) Date of Patent: Aug. 28, 2001

(54) PROCESS AND APPARATUS FOR REMOVING SOLIDS FROM AN AQUEOUS PAPER FIBER SUSPENSION

(75) Inventors: Axel Gommel, Ravensburg; Martin Kemper; Almut Kriebel, both of Weingarten, all of (DE)

(73) Assignee: Voith Sulzer Papiertechnik Patent GmbH, Heidenheim (DE)

( * ) Notice: Subject to any disclaimer, the term of this patent is extended or adjusted under 35 U.S.C. 154(b) by 0 days.

(21) Appl. No.: 09/497,161

(22) Filed: Feb. 3, 2000

(30) Foreign Application Priority Data

Feb. 10, 1999 (DE) .............................................. 199 05 439

(51) Int. Cl.$^7$ ....................................................... B03D 1/14
(52) U.S. Cl. ...................... 209/168; 209/170; 210/221.2; 162/4
(58) Field of Search ................................. 162/4; 209/164, 209/168, 170; 210/221.2

(56) References Cited

U.S. PATENT DOCUMENTS

| | | | |
|---|---|---|---|
| 4,288,319 | * | 9/1981 | Heijs et al. . |
| 4,436,617 | * | 3/1984 | Moore et al. . |
| 4,913,805 | | 4/1990 | Chin . |
| 5,236,090 | * | 8/1993 | Britz et al. . |

FOREIGN PATENT DOCUMENTS

| | | | |
|---|---|---|---|
| 211494 | * | 12/1981 | (DE) . |
| 798416 | | 10/1997 | (EP) . |
| 56-045774 | * | 4/1981 | (JP) . |
| 93/14876 | * | 8/1993 | (WO) . |
| 99/61699 | * | 12/1999 | (WO) . |

* cited by examiner

Primary Examiner—Thomas M. Lithgow
(74) Attorney, Agent, or Firm—Greenblum & Bernstein, P.L.C.

(57) ABSTRACT

Process and apparatus for removing solids from an aqueous fiber suspension in a flotation container that includes a drainage section. The process includes adding gas bubbles to the fiber suspension entering the flotation container, and collecting a flotation foam formed within the flotation container. The flotation foam includes the solids to be removed. The process also includes laterally moving the flotation foam in the drainage section, such that at least a portion of fluid within the flotation foam is drained from the flotation foam, collecting the drained fluid in the drainage section, discharging the drained fluid from the drainage section, discharging the flotation foam as a rejects material, and discharging a purified fiber suspension as an accepted stock suspension. The apparatus includes a flotation container, and a drainage section coupled to the flotation container. The drainage section is arranged to drain at least a portion of fluid from a flotation foam. The apparatus also includes a rejects outlet coupled to the drainage section, an accepts outlet coupled to the flotation container, and a fluid collector coupled to the drainage section for collecting the fluid drained from the flotation foam.

29 Claims, 2 Drawing Sheets

PROCESS AND APPARATUS FOR REMOVING SOLIDS FROM AN AQUEOUS PAPER FIBER SUSPENSION

CROSS-REFERENCE TO RELATED APPLICATIONS

The present application claims priority under 35 U.S.C. § 119 of German Patent Application No. 199 05 439.8, filed on Feb. 10, 1999, the disclosure of which is expressly incorporated by reference herein in its entirety.

BACKGROUND OF THE INVENTION

1. Field of the Invention

The present invention relates to a process and apparatus for removing solids from an aqueous fiber suspension, e.g., a paper fiber suspension, with the aid of gas bubbles. The removed solids are collected in a flotation foam, and discharged as rejects. In this way, the fiber suspension is purified to be constituted by accepted stock suspension.

2. Discussion of Background Information

Processes of the type similar in general that discussed above are used to remove at least a part of the solid particles suspended in a fibrous material-containing suspension. As is known in flotation, foam or scum is formed which contains the materials to be removed. A typical application of this type of process produces an aqueous paper fiber suspension from printed waste paper in which ink particles have already been removed from fibers so that they can be floated out. Thus, this flotation process exploits the differences between fibrous material and undesirable solid particles so that the fibrous material, which is hydrophilic, remains in the fibrous material suspension while the solid particles to be removed, which are hydrophobic, therefore, end up in the foam along with the air bubbles. In addition to ink particles, there are a multitude of other hydrophobic substances that can be removed from the fibrous material via flotation. These substances include, e.g., glues, fine plastic particles, and possibly also resins. If one simply wanted to separate fibers from impurities via flotation, i.e., not all solid particles are to be sorted out, then such a process is referred to as "selective flotation" or "flotation de-inking." As a rule, "flotation de-inking," is not only utilized for the removal of ink particles, but is also generally used for the selective flotation of impurities out of fibrous material suspensions.

The prior art with regard to flotation processes and device for fibrous material suspensions has been extensively developed. Therefore, there are embodiments which are quite suitable for removing a large part of the solid particles via flotation. An important aspect in processes of this type, however, involves which composition and properties are achieved in the flotation foam. Thus, it is desired to remove the flotation foam from the flotation system in the most dewatered form possible, so that removed foam contains the greatest possible quantity of the floated-out impurities and the lowest possible quantity of paper fibers. In general, the flotation foam is collected above the suspension involved in the flotation and is removed, e.g., laterally via a foam weir or vertically upward via a suction device. As a result, dewatering, i.e., drainage, of the flotation foam takes place.

SUMMARY OF THE INVENTION

The present invention provides a flotation process for effectively removing certain solids from the fibrous material suspension and further dewatering of the flotation foam produced, without significantly increasing the cost.

In particular, the present invention includes laterally removing the flotation foam from the fiber suspension, e.g., a paper fiber suspension, in a drainage section, collecting a part of the fluid contained within the flotation foam in the drainage section and removing the fluid.

By virtue of the fact that, according to the instant invention, the flotation foam is laterally removed or obliquely upwardly removed in a special drainage section, the flotation foam travels along a relatively long path in which a part of the fluid contained within the flotation foam can be collected and drained away. As a result, the foam can be dewatered in a simple manner, which is advantageous to known devices because the expressing of water from greasy flotation foam is very expensive. The fluid, generally dirty water, comes out of the foam, and, after a short downward section, reaches, e.g., a wall that adjoins the bottom of the drainage section so that the fluid can be drained away against this wall. This arrangement can also effectively prevent an undesirable pushing back or damming up of subsequent flotation foam. Another important advantage of the present invention lies in the fact that, if necessary, it is easily possible to drain the removed fluid from the flotation container. In general, this fluid may be more heavily encumbered with impairing solids than the suspension itself.

There are a number of possibilities for treating the draining fluid. For example, the fluid can be removed from the flotation container and supplied to a special purification or other re-use device. Alternatively, the fluid can flow directly back into the suspension in which the flotation is carried out. It would be advantageous if the paper fibrous suspension in the flotation container were not swirled so intensely that the draining fluid could get into the outlet for the purified fibrous material suspension, i.e., the accepted stock. Another possibility lies in bringing the fluid back, together with the paper fiber suspension flowing into the flotation container, in order to subject it to renewed flotation. When the flotation container is closed, the flotation air may nonetheless be aspirated out of the container and conveyed into a ventilation injector. In the process according to the invention, a mixture of air or gas and the returned fluid can be carried out.

The present invention is directed to a process for removing solids from an aqueous fiber suspension in a flotation container that includes a drainage section. The process includes adding gas bubbles to the fiber suspension entering the flotation container, and collecting a flotation foam formed within the flotation container. The flotation foam includes the solids to be removed. The process also includes laterally moving the flotation foam in the drainage section, such that at least a portion of fluid within the flotation foam is drained from the flotation foam, collecting the drained fluid in the drainage section, discharging the drained fluid from the drainage section, discharging the flotation foam as a rejects material, and discharging a purified fiber suspension as an accepted stock suspension.

According to a feature of the invention, the drained fluid may be collected against a wall that adjoins a bottom of the drainage section.

In accordance with another feature of the invention, a flow direction in the drainage section can have an inclination angle between approximately 0° and 80° in relation to the horizontal. Further, the inclination angle can be between approximately 30° and 60°.

In accordance with still another feature of the present invention, the process can further include adjusting an inclination angle of the drainage section relative to horizontal.

The process may further include supplying the drained fluid discharged from the drainage section to the fiber suspension entering the flotation container. The drained fluid can be supplied without special purification. Moreover, the process can include adding gas bubbles the fluid and the fiber suspension entering the flotation container. The flotation container can include an injector, and the process may further include ventilating the fiber suspension with the injector, and aspirating the gas being freed from the flotation foam and the fluid flowing out of the drainagce section with the injector.

According to a further feature of the invention, the process may further include clarifying the drained fluid removed from the drainage section.

In accordance with still another feature of the instant invention, a flow cross section of the drainage section may be one of round and oval.

In accordance with a still further feature of the invention, the flow cross section in the drainage section can decrease in the flow direction of the flotation foam.

Moreover, a length of the drainage section may correspond at least to a path that the flotation foam travels in the drainage section during a maximal sedimentation time of the fluid drained from the flotation foam.

Further, at the end of the drainage section, a pressure difference can be produced with the aid of a throttle. The pressure difference at the throttle can be adjustable.

Still further, the inclination angle in the drainage section can decrease one of continuously and discontinuously. Alternatively, the inclination angle in the drainage section can increase one of continuously and discontinuously.

According to another feature of the invention, the fiber suspension can include a paper fiber suspension.

The process can further include dissolving thickened portions of the flotation foam in the drainage section.

Further still, the process can further include damming up a region for collecting the drained fluid, and regulating the removal of the drained fluid.

The present invention is directed to an apparatus for removing solids from an aqueous fiber suspension. The apparatus includes a flotation container, and a drainage section coupled to the flotation container. The drainage section is arranged to drain at least a portion of fluid from a flotation foam. The apparatus also includes a rejects outlet coupled to the drainage section, an accepts outlet coupled to the flotation container, and a fluid collector coupled to the drainage section for collecting the fluid drained from the flotation foam.

In accordance with a feature of the present invention, the drainage section includes a wall oriented to transport the fluid drained from the flotation foam to the fluid collector.

According to another feature of the invention, a suspension inlet can be coupled to the flotation container, and a gas bubble supply can be coupled to the suspension inlet. Gas bubbles may be added to the fibrous suspension before the fibrous suspension enters the flotation container. The fluid collector may be coupled to the suspension inlet, and gas bubbles may be added to the drained fluid and the fibrous suspension in the suspension inlet before the drained fluid and the fibrous suspension enter the flotation container.

In accordance with still another feature of the instant invention, the drainage section can be oriented at an angle between approximately 0° and 80° in relation to the horizontal. Further, the drainage section may be oriented at an angle between approximately 30° and 60°.

According to still another feature of the present invention, Rinsing devices may be positioned to dissolve thickened portions of the flotation foam in the drainage section.

In accordance with a further feature of the invention, the drainage section can be positionably orientable to an angular orientation between approximately 0° and 80° in relation to the horizontal. Further, a drive unit can be coupled to the drainage section to positionably orient the drainage section at an angle between approximately 0° and 80° in relation to the horizontal.

According to yet another feature of the instant invention, the drainage section has a length that corresponds at least to a path that the flotation foam travels in the drainage section during a maximal sedimentation time of the fluid drained from the flotation foam.

Other exemplary embodiments and advantages of the present invention may be ascertained by reviewing the present disclosure and the accompanying drawing.

BRIEF DESCRIPTION OF THE DRAWINGS

The present invention is further described in the detailed description which follows, in reference to the noted plurality of drawings by way of non-limiting examples of exemplary embodiments of the present invention, in which like reference numerals represent similar parts throughout the several views of the drawings, and wherein.

DETAILED DESCRIPTION OF THE PRESENT INVENTION

The particulars shown herein are by way of example and for purposes of illustrative discussion of the embodiments of the present invention only and are presented in the cause of providing what is believed to be the most useful and readily understood description of the principles and conceptual aspects of the present invention. In this regard, no attempt is made to show structural details of the present invention in more detail than is necessary for the fundamental understanding of the present invention, the description taken with the drawings making apparent to those skilled in the art how the several forms of the present invention may be embodied in practice.

Figure 1:
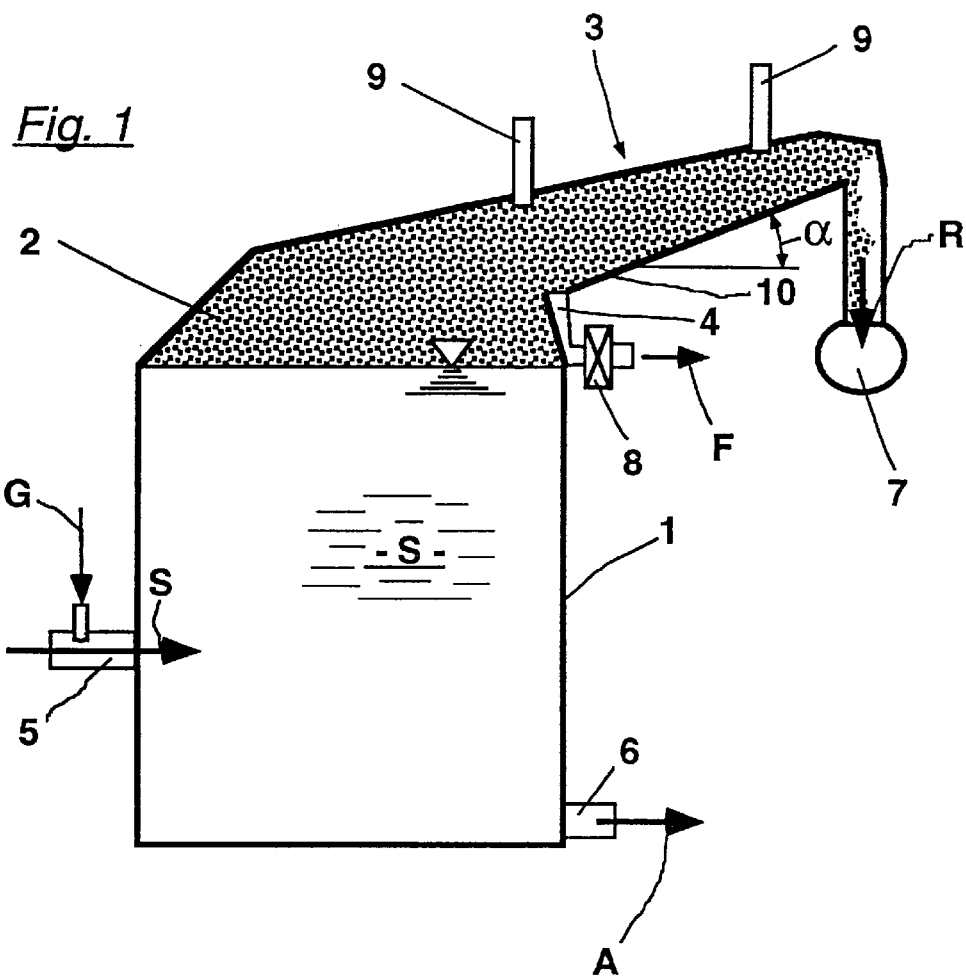
FIG. 1 illustrates a flotation device for carrying out the process according to the invention.

In a highly schematic manner, FIG. 1 illustrates a flotation device which is suited for carrying out the process according to the present invention, which includes a flotation container 1, in which a fiber suspension S, e.g., paper fiber suspension, is disposed. Fiber suspension S is mixed with a gas G, e.g., air or other suitable gas for flotation, in an injector 5 before entry into flotation container 1 so that a suspension-air bubble mixture, suited for flotation, is produced. Due to the flotation effect, which is a known procedure, undesirable components of fiber suspension S are floated upward and concentrated in a flotation foam 2. Purified suspension comes out of flotation container 1 through an accepted stock outlet 6 as accepted stock suspension A. Advantageously, the process can be performed in a continuous fashion. Due to a prevailing pressure difference, which is produced, e.g., via suction in foam suction line 7, flotation foam 2 travels into drainage section 3. In drainage section 3, flotation foam 2 may be conveyed at an inclination angle α, e.g., obliquely upward, so that an inclined section is formed. Inclination angle α may be, e.g., between approximately 0° and 80° to horizontal, and preferably between approximately 30° and 60°. After passing through the inclined section, foam 2 falls down into foam suction line 7 and constitutes rejects R removed from flotation container 1. Fluid F, which can in along wall 10 of the inclined section in a direction of gravity, can be separately removed through a pocket 4. In this regard, a definite damming up can be produced with an adjustable valve 8, which can be regulated. Further, it may be possible for accumulations of flotation foam 2 to build up against the walls of drainage section 3 and to solidify to such a degree that they could cause malfunctions. For this reason, rinsing lines 9 can be provided to dissolve the thickened parts with the aid of water. In another embodiment, rinsing lines 9 can be deliberately formed and used for washing out flotation foam 2, e.g., for recovering fibers that have been inadvertently floated out. Rinsing devices, e.g., spray heads, which can be moved along drainage section 3 can also be used. Such or similar devices are known from conduit cleaning.

Figure 2:
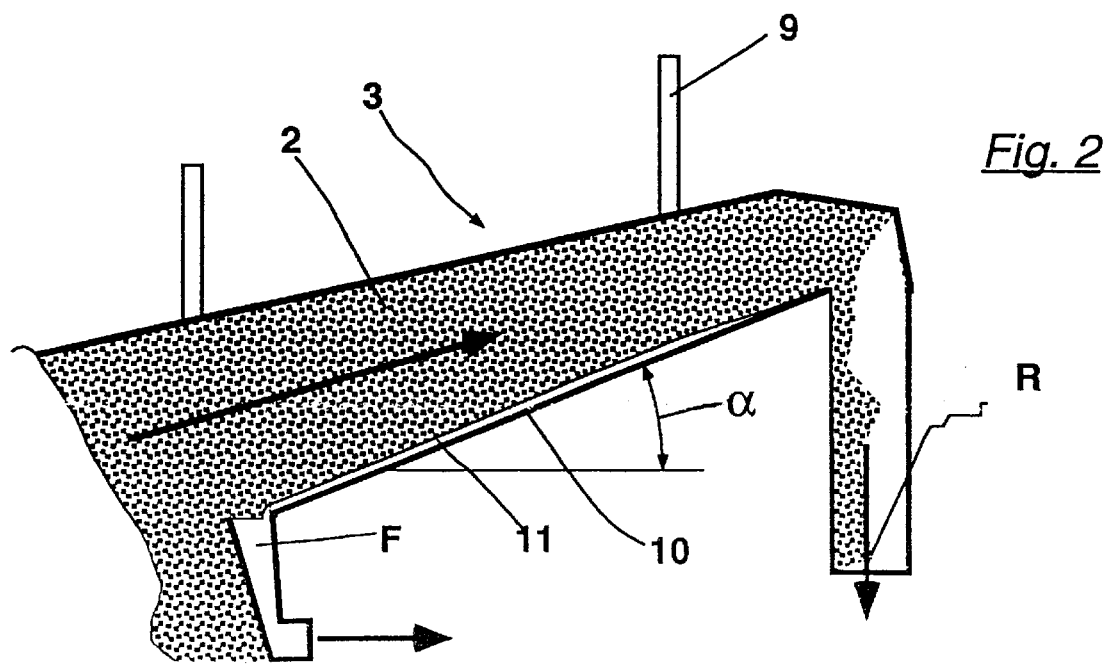
FIG. 2 illustrates a detail of the drainage section depicted in FIG. 1.

FIG. 2 illustrates in more detail drainage section 3. Fluid under-layer 11, which is formed by fluid draining from flotation foam 2, can be arranged along wall 10 that adjoins the bottom of drainage section 3. It is noted that this illustration is highly schematic and that only elements necessary for the understanding of the invention are depicted. The selection of inclination angle α depends on the existing conditions and goals of the process. In many instances, the inclination angle may be steeper than as shown in FIGS. 1 and 2. It may also be conceivable to form flotation device 1 so that inclination angle α can be adjusted during operation so as to produce optimal conditions for the flotation process. An adjusting motor for changing inclination angle α can be easily integrated into a control loop. For example, drainage can begin with a foam flow directed vertically upward before transitioning into a horizontal or incline flow direction, i.e., the incline may be either directed upwardly or downwardly. It can also be advantageous to drain flotation foam 2 with an inclination angle that increases in the flow direction. Moreover, a flow cross section of drainage section 3 can taper down in the flow direction. In this way, the decrease in foam volume can be taken into account so that an excessive reduction in the flow speed is prevented.

If a diaphragm (not shown here) is attached to the end of drainage section 3, then a further reduction of foam volume may be possible with a corresponding pressure difference.

Figure 3:
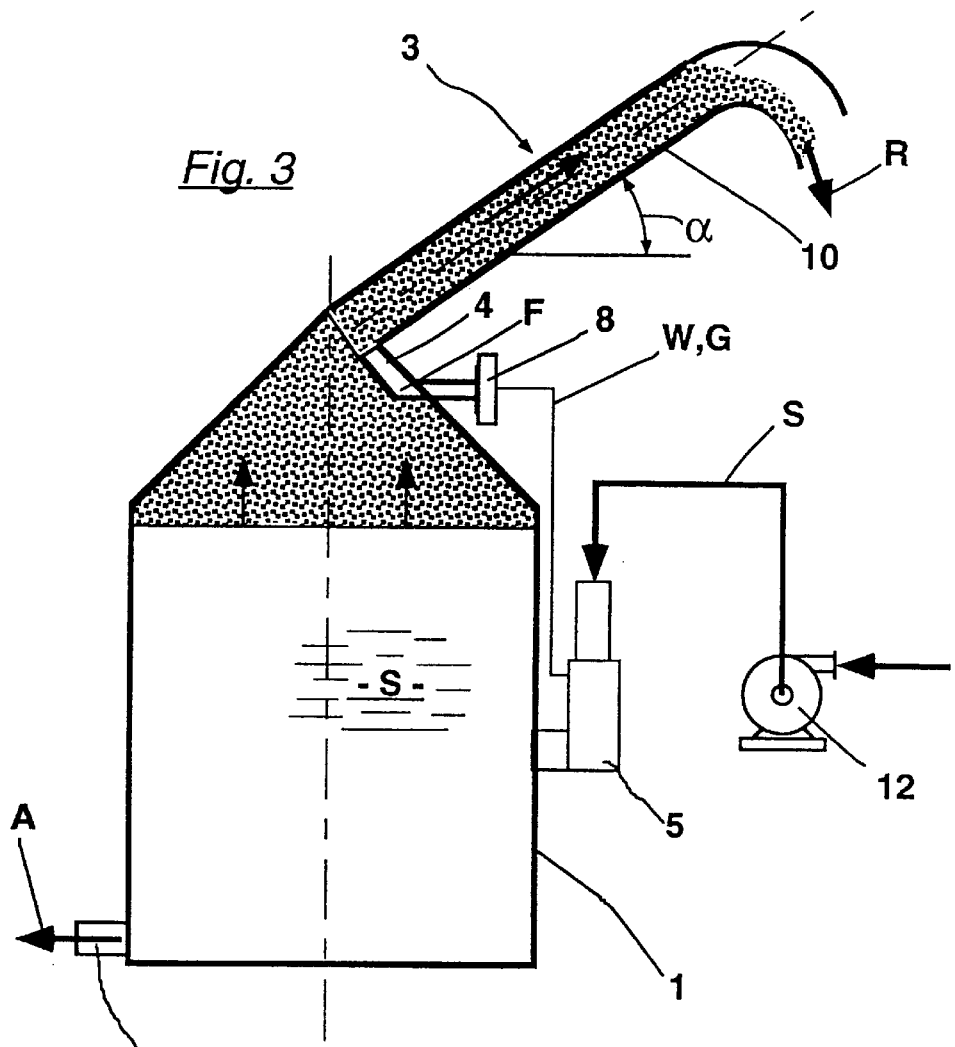
FIG. 3 illustrates an alternative embodiment of the invention.

FIG. 3 illustrates an alternative embodiment of the invention in which flotation container 1 is shaped slightly differently and at a steeper inclination angle α than as depicted in FIG. 1. Fluid F, which flows down in the inclined section can be captured in a pocket 4 so that it cannot subsequently return to foam 2 or suspension S. The process according to this embodiment operates with a slight overpressure, e.g., produced by a stock pump 12, which is dimensioned so that flotation foam 2 can be transported through the inclined section. An injector 5 can be used for ventilation and aspiration of gas G required for bubble generation in flotation container 1. As a result, flow routing can be selected so that gas G, together with returned fluid F, travels into injector 5. Thus, impurity components disposed in fluid F can be brought into contact with air bubbles so that flotation can be performed again.

Figure 4:
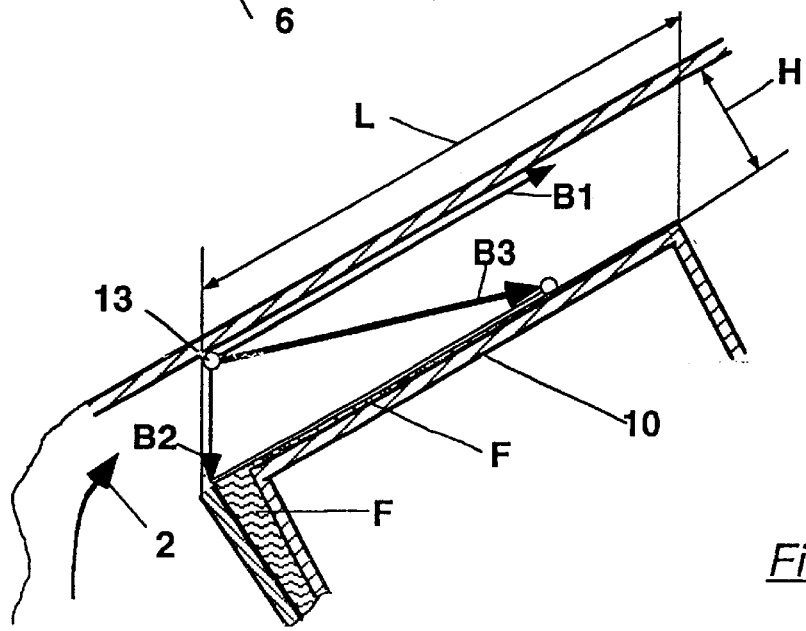
FIG. 4 shows an explanatory vector diagram.

FIG. 4 schematically depicts the movement in the inclined section of drainage section 3 in which fluid falls through flotation foam 2, thereby forming fluid under-layer 11. Thus, it is important that mobile water droplets 13, which are contained in flotation foam 2, can be removed from flotation foam 2 before being discharged as part of reject R. For this reason, drainage section 3 is provided with a length L. Theoretically, with a water droplet 13 which is located at an upper edge of the conduit forming drainage section 3, the probability of sedimentation on the lower edge of the conduit is the lowest. As a result of sedimentation speed, in a particular sedimentation time, water droplet 13 can travel path B2, which transports water droplet 13 into a region beneath flotation foam 2. The sedimentation time depends on a height H of the conduit, inclination angle α, and conditions in flotation foam 2. Within the same time period, flotation foam 2 travels path B1 in drainage section 3 due to its transport speed. Thus, a resulting path B3 for the water droplet can be produced, viewed in absolute terms. Further, if length L is provided to be at least as long as path B1, then the desired effect can occur.

It is noted that the foregoing examples have been provided merely for the purpose of explanation and are in no way to be construed as limiting of the present invention. While the present invention has been described with reference to an exemplary embodiment, it is understood that the words which have been used herein are words of description and illustration, rather than words of limitation. Changes may be made, within the purview of the appended claims, as presently stated and as amended, without departing from the scope and spirit of the present invention in its aspects. Although the present invention has been described herein with reference to particular means, materials and embodiments, the present invention is not intended to be limited to the particulars disclosed herein; rather, the present invention extends to all functionally equivalent structures, methods and uses, such as are within the scope of the appended claims.

What is claimed:

1. A process for removing solids from an aqueous fiber suspension in a flotation container that includes a drainage section, the process comprising:

adding gas bubbles to the fiber suspension entering the flotation container;

collecting a flotation foam formed within the flotation container, the flotation foam including the solids to be removed;

laterally moving the flotation foam in the drainage section, whereby at least a portion of fluid within the flotation foam is drained from the flotation foam;

collecting, at a location above a level of the fiber suspension, the drained fluid in the drainage section;

discharging the drained fluid collected above the level of the fiber suspension from the drainage section;

discharging the flotation foam as a rejects material; and discharging a purified fiber suspension as an accepted stock suspension.

2. The process in accordance with claim 1, wherein the drained fluid is collected against a wall that adjoins a bottom of the drainage section.

3. The process in accordance with claim 1, wherein a flow direction in the drainage section has an inclination angle between approximately 0° and 80° in relation to the horizontal.

4. The process in accordance with claim 3, wherein the inclination angle is between approximately 30° and 60°.

5. The process in accordance with claim 1, further comprising adjusting an inclination angle of the drainage section relative to horizontal.

6. The process in accordance with claim 1, further comprising supplying the drained fluid discharged from the drainage section to the fiber suspension entering the flotation container, wherein the drained fluid is supplied without special purification.

7. The process in accordance with claim 6, further comprising adding gas bubbles the fluid and the fiber suspension entering the flotation container.

8. The process in accordance with claim 7, wherein the flotation container further includes an injector, and the process further comprises:

ventilating the fiber suspension with the injector; and aspirating the gas being freed from the flotation foam and the fluid flowing out of the drainage section with the injector.

9. The process in accordance with claim 1, further comprising clarifying the drained fluid removed from the drainage section.

10. The process in accordance with claim 1, wherein a flow cross section of the drainage section is one of round and oval.

11. The process in accordance with claim 1, wherein the flow cross section in the drainage section decreases in the flow direction of the flotation foam.

12. The process in accordance with claim 1, wherein a length of the drainage section corresponds at least to a path that the flotation foam travels in the drainage section during a maximal sedimentation time of the fluid drained from the flotation foam.

13. The process in accordance with claim 1, wherein at the end of the drainage section, a pressure difference is produced with the aid of a throttle.

14. The process in accordance with claim 13, wherein the pressure difference at the throttle is adjustable.

15. The process in accordance with claim 1, wherein the inclination angle in the drainage section decreases one of continuously and discontinuously.

16. The process in accordance with claim 1, wherein the inclination angle in the drainage section increases one of continuously and discontinuously.

17. The process in accordance with claim 1, wherein the fiber suspension comprises a paper fiber suspension.

18. The process in accordance with claim 1, further comprising dissolving thickened portions of the flotation foam in the drainage section.

19. The process in accordance with claim 1, further comprising damming up a region for collecting the drained fluid; and regulating the removal of the drained fluid.

20. An apparatus for removing solids from an aqueous fiber suspension, comprising:

a flotation container containing said fiber suspension and solids;

a drainage section coupled to said flotation container, wherein said drainage section is arranged to drain at least a portion of fluid from a flotation foam;

a rejects outlet coupled to said drainage section;

an accepts outlet coupled to said flotation container; and a fluid collector located above a level of the fiber suspension and coupled to said drainage section for collecting, at a location above the level of the fiber suspension, the fluid drained from the flotation foam.

21. The apparatus in accordance with claim 20, said drainage section comprising a wall oriented to transport the fluid drained from the flotation foam to the fluid collector.

22. The apparatus in accordance with claim 20, further comprising:

a suspension inlet coupled to the flotation container; and a gas bubble supply coupled to said suspension inlet, wherein gas bubbles are added to the fibrous suspension before the fibrous suspension enters the flotation container.

23. The apparatus in accordance with claim 22, wherein said fluid collector is coupled to said suspension inlet, and wherein gas bubbles are added to the drained fluid and the fibrous suspension in the suspension inlet before the drained fluid and the fibrous suspension enter the flotation container.

24. The apparatus in accordance with claim 20, wherein said drainage section is oriented at an angle between approximately 0° and 80° in relation to the horizontal.

25. The apparatus in accordance with claim 24, wherein said drainage section is oriented at an angle between approximately 30° and 60°.

26. The apparatus in accordance with claim 20, further comprising rinsing devices positioned to dissolve thickened portions of the flotation foam in the drainage section.

27. The apparatus in accordance with claim 20, wherein said drainage section is positionably orientable to an angular orientation between approximately 0° and 80° in relation to the horizontal.

28. The apparatus in accordance with claim 27, further comprising a drive unit coupled to said drainage section to positionably orient said drainage section at an angle between approximately 0° and 80° in relation to the horizontal.

29. The apparatus in accordance with claim 20, wherein said drainage section has a length that corresponds at least to a path that the flotation foam travels in said drainage section during a maximal sedimentation time of the fluid drained from the flotation foam.

* * * * *